United States Patent
Livet et al.

(10) Patent No.: US 7,792,108 B2
(45) Date of Patent: Sep. 7, 2010

(54) METHOD AND APPARATUS FOR TRANSMITTING CONCATENATED FRAMES IN A WIRELESS COMMUNICATION SYSTEM

(75) Inventors: Catherine Livet, Montreal (CA); John L. Tomici, Southold, NY (US); Juan Carlos Zuniga, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 590 days.

(21) Appl. No.: 11/398,155

(22) Filed: Apr. 4, 2006

(65) Prior Publication Data

US 2006/0262794 A1 Nov. 23, 2006

Related U.S. Application Data

(60) Provisional application No. 60/669,663, filed on Apr. 8, 2005.

(51) Int. Cl.
 *H04L 12/28* (2006.01)
(52) U.S. Cl. ............... 370/390; 370/338; 370/310.2; 370/466
(58) Field of Classification Search ............ 455/41.2; 370/338, 401, 473, 474, 315–316, 347, 310.1, 370/328, 390, 466
See application file for complete search history.

(56) References Cited

U.S. PATENT DOCUMENTS

| | | | |
|---|---|---|---|
| 5,949,776 A | 9/1999 | Mahany et al. | |
| 6,466,591 B1 * | 10/2002 | See et al. ................ | 370/535 |
| 6,512,751 B1 | 1/2003 | Struhsaker et al. | |
| 6,522,650 B1 * | 2/2003 | Yonge et al. ................ | 370/390 |
| 6,674,737 B1 | 1/2004 | Baker | |
| 6,674,741 B1 | 1/2004 | Rasanen | |
| 6,807,165 B2 * | 10/2004 | Belcea ................ | 370/347 |
| 6,907,044 B1 * | 6/2005 | Yonge et al. ................ | 370/445 |
| 6,920,113 B1 * | 7/2005 | Kovvali et al. ................ | 370/255 |
| 6,990,121 B1 * | 1/2006 | Stiles et al. ................ | 370/498 |
| 7,103,008 B2 * | 9/2006 | Greenblat et al. ............ | 370/258 |
| 7,173,930 B2 * | 2/2007 | Wellbaum et al. ............ | 370/356 |
| 7,298,691 B1 * | 11/2007 | Yonge et al. ................ | 370/203 |
| 7,339,921 B2 * | 3/2008 | Kim et al. ................ | 370/349 |
| 7,564,826 B2 * | 7/2009 | Sherman et al. ............ | 370/338 |
| 2002/0097696 A1 * | 7/2002 | Kossi et al. ................ | 370/330 |
| 2002/0154653 A1 * | 10/2002 | Benveniste ................ | 370/447 |
| 2002/0176390 A1 * | 11/2002 | Sparr et al. ................ | 370/338 |
| 2004/0013129 A1 * | 1/2004 | Fang ................ | 370/466 |

(Continued)

OTHER PUBLICATIONS

IEEE P802.11n/D1.0, Draft Amendment to Standard [FOR] Information Technology—Telecommunications and information exchange between systems- Local and Metropolitan networks—Specific requirements—Part 11: Wireless LAN Medium Access Control (MAC) and Physical Layer (PHY) specifications: Enhancements for Higher Throughput (Mar. 2006).

*Primary Examiner*—Sharad Rampuria
(74) *Attorney, Agent, or Firm*—Volpe and Koenig, P.C.

(57) ABSTRACT

The present invention is related to a method and apparatus for transmitting concatenated frames in a wireless communication system comprising a plurality of mesh points (MPs). In one embodiment, a first MP transmits a data stream to a second MP, wherein the data stream is further transmitted to a third MP as a final destination. The second MP receives the data stream from the first MP. The second MP transmits a concatenated frame to the first and third MPs.

18 Claims, 4 Drawing Sheets

U.S. PATENT DOCUMENTS

2004/0184450 A1* 9/2004 Omran .................... 370/372
2007/0189249 A1* 8/2007 Gurevich et al. ........... 370/338
2009/0092076 A1* 4/2009 Zheng et al. ............... 370/328

* cited by examiner

METHOD AND APPARATUS FOR TRANSMITTING CONCATENATED FRAMES IN A WIRELESS COMMUNICATION SYSTEM

CROSS REFERENCE TO RELATED APPLICATIONS

This application claims the benefit of U.S. Provisional Application No. 60/669,663 filed Apr. 8, 2005, which is incorporated herein by reference as if fully set forth.

FIELD OF INVENTION

The present invention relates to wireless communication networks. In particular, the present invention relates to a method and apparatus for concatenated frame transmission in a wireless communication system.

BACKGROUND

Wireless local area networks (WLANs) are becoming more widespread as wireless technology continues to become more advanced, and variations of wireless networks may exist. For example, a traditional WLAN might be based on a structured infrastructure system that includes a base station which communicates with wireless devices and routes traffic between them. An additional type of wireless network is an ad-hoc network, where a wireless device communicates with one or more additional wireless devices in a point-to-point technique where wireless devices connect to, and disconnect from, the network dynamically.

As a combination of the traditional system structure and an ad-hoc network, a mesh network may include user devices, terminals, access points (APs), and base stations, which all function as mesh points (MPs) in the wireless system. Mesh networks have been garnering increasing support in the standards community due to characteristics such as low-effort coverage extension for WLANs, low-effort and low-complexity self-deploying WLANs, and for their high fault-tolerance and redundancy.

In a WLAN mesh, a set of two or more MPs are interconnected via IEEE 802.11 links. Each Mesh Point (MP) on a mesh network receives and transmits its own traffic, while acting as a router or relay node for other devices.

The IEEE 802.11 (Wi-Fi) standard also specifies support for multicasting as part of asynchronous services. A multicast packet includes a group address that delivers the same packet to more than one destination. This is particularly useful for instance when some specific type of data traffic (e.g., streaming services) is meant to be received by several nodes in the network.

In WLAN systems, the definition of multicast may include the following: "A medium access control (MAC) address that has the group bit set. A multicast MAC service data unit (MSDU) is one with a multicast destination address. A multicast MAC protocol data unit (MPDU) or control frame is one with a multicast receiver address." Hence, an Access Point (AP) (in Infrastructure mode) or a station (STA) or Client (in Ad-hoc mode) transmits a frame over the air with a multicast destination address, which is then decoded by the receivers that have subscribed to this service and multicast address.

There is a need, however, to transmit concatenated frames in a wireless communication system that is not subject to the limitations of the prior art.

SUMMARY

The present invention is related to a method and apparatus for transmitting concatenated frames in a wireless communication system comprising a plurality of mesh points (MPs). In one embodiment, a first MP transmits a data stream to a second MP, wherein the data stream is further transmitted to a third MP as a final destination. The second MP receives the data stream from the first MP. The second MP transmits a concatenated frame to the first and third MPs.

BRIEF DESCRIPTION OF THE DRAWINGS

The foregoing summary, as well as the following detailed description of the preferred embodiments of the present invention will be better understood when read with reference to the appended drawings, wherein.

DETAILED DESCRIPTION OF THE PREFERRED EMBODIMENT(S)

Hereafter, a mesh point (MP) refers to a wireless transmit/receive unit (WTRU), which includes but is not limited to, a user equipment, mobile station, fixed or mobile subscriber unit, pager, or any other type of device capable of operating in a wireless environment. Additionally, an MP may refer to a base station which includes, but is not limited to a Node-B, site controller, access point or any other type of interfacing device in a wireless environment.

The features of the present invention may be incorporated into an integrated circuit (IC) or be configured in a circuit comprising a multitude of interconnecting components.

Figure 1:
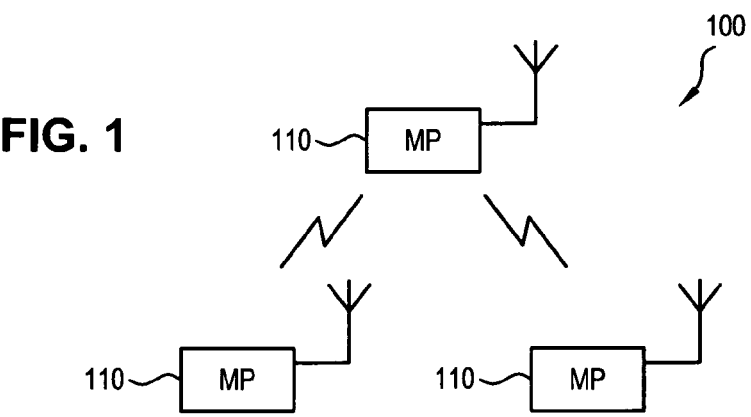
FIG. 1 shows a wireless communication system configured in accordance with the present invention.

FIG. 1 shows a wireless communication system 100 configured in accordance with the present invention. The wireless communication system 100 includes a plurality of MPs 110, capable of wireless communication with one another.

Figure 2:
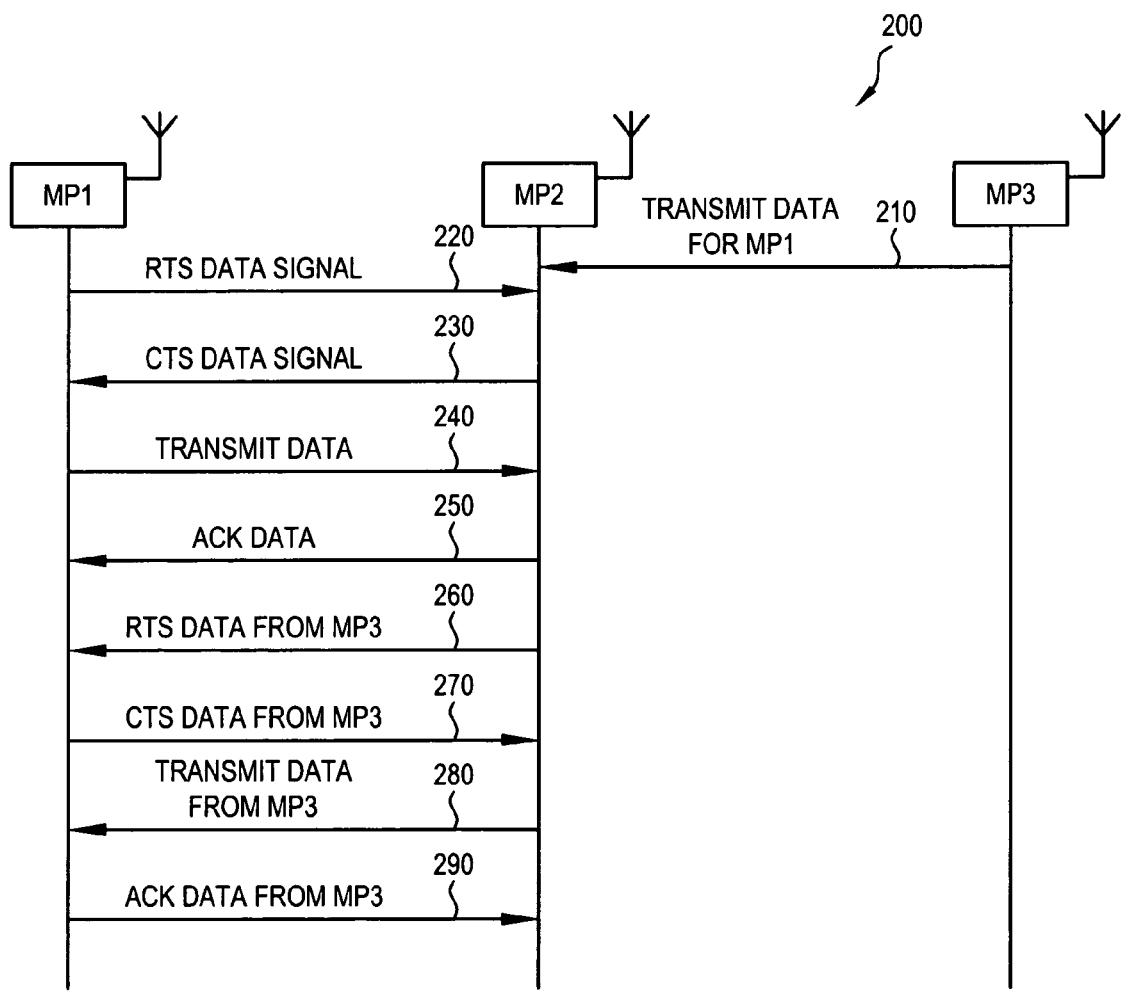
FIG. 2 is a prior art signal diagram for transmitting data in a wireless communication system.

FIG. 2 is a prior art signal diagram for transmitting data in a wireless communication system 200. The prior art signal diagram 200 depicts an MP1, MP2, and MP3 transmitting signals to one another. In particular, first MP3 transmits data destined for MP1 to MP2 (210). The MP1 transmits a request to send (RTS) data signal to the MP2 (220). The MP2 transmits a clear to send (CTS) data signal to the MP1 (230). The MP1 then transmits its data (240), and MP2 acknowledges (ACK) the data (250).

When that transfer is complete, MP2 transmits an RTS data signal to MP1 (260) to transmit the data from MP3 (210). The MP1 transmits a CTS data signal to MP2 (270). The MP2 transmits the data received from MP3 to MP1 (280), and MP1 ACKs the data (290).

Figure 3:
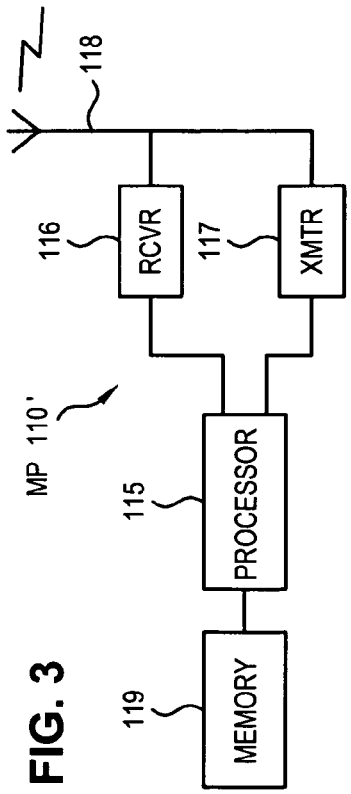
FIG. 3 is a functional block diagram of a mesh point (MP) configured in accordance with the present invention.

FIG. 3 is a functional block diagram of an MP 110 configured in accordance with the present invention.

In addition to the nominal components included in a typical MP, the MP 110' includes a processor 115 configured to transmit and receive unicast, multicast, or broadcast concatenated signals, a receiver 116 in communication with the processor 115, a transmitter 117 in communication with the processor 115, a memory 119 in communication with the processor 115, and an antenna 118 in communication with both the receiver 116 and the transmitter 117 to facilitate the transmission and reception of wireless data to and from the MP 110'.

Figure 4:
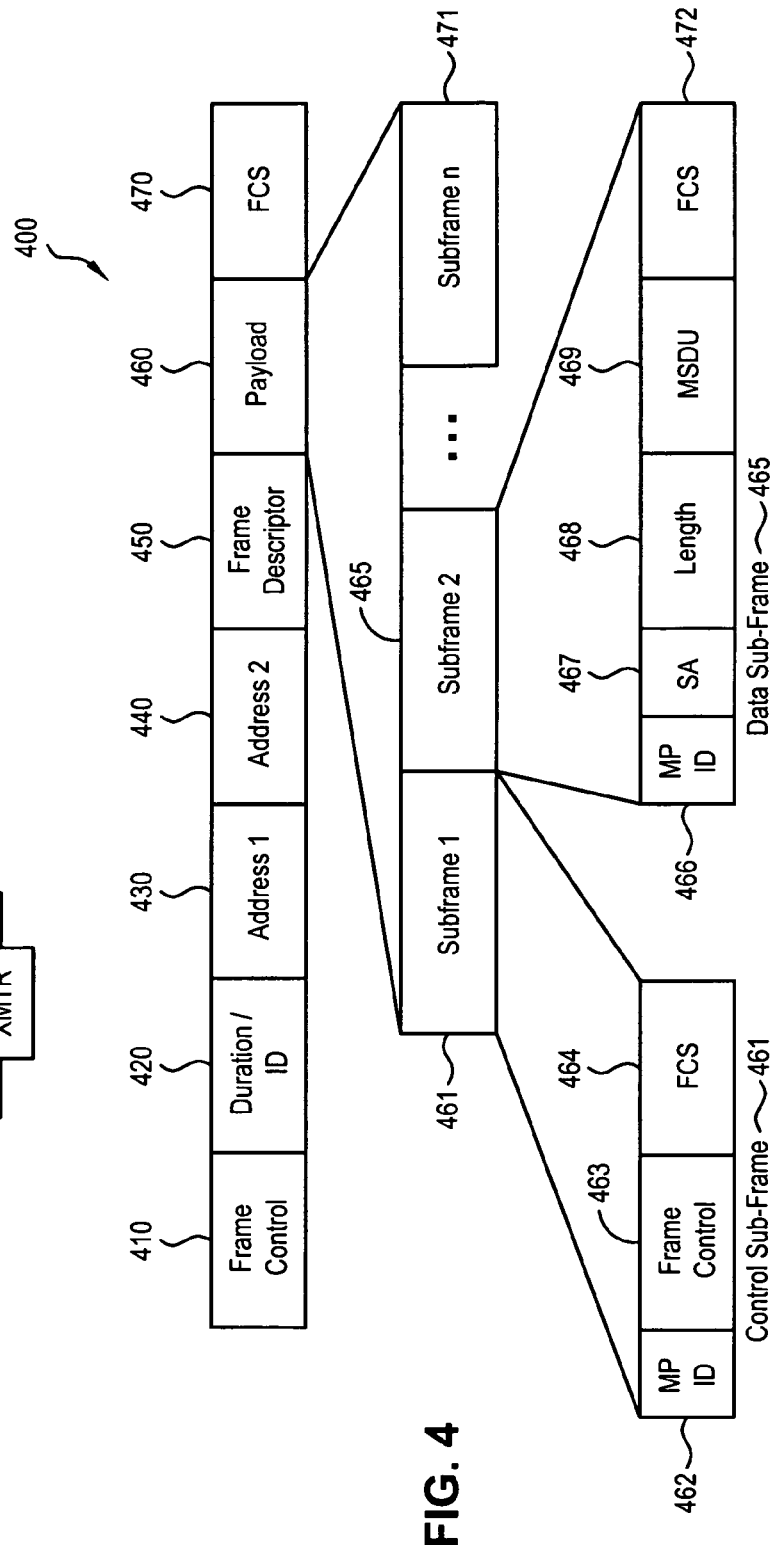
FIG. 4 shows a concatenated frame structure, in accordance with the present invention.

FIG. 4 shows a concatenated frame structure 400, in accordance with the present invention. The concatenated frame structure 400 includes a frame control field 410, a duration/ID field 420, an address 1 field (430), an address 2 field (440), a frame descriptor field 450, a payload 460 and a frame checksum (FCS) 470. The payload 460 may further includes a plurality of subframes.

The frame control field 410 includes a concatenated frame. The concatenated frame includes information for multiple MPs which may include control information such as RTS, CTS and ACK signals, management information, or data information. Additionally, the concatenated frame may be encrypted. For example, a single key encryption may be used to encrypt the entire frame. In this case, the encrypted frame can be decoded by the addressed unicast MP (e.g. pair-wise key), or all the MPs in the addressed multicast group (e.g. group-key).

Alternatively, the header of the frame may be unencrypted. In this case, the individual concatenated frames should be encrypted with a unicast key (pair-wise key), or a multicast or broadcast key (group key).

The duration/ID field 420 contains duration information as typically included in an IEEE 802.11 duration field. This duration is associated with the entire duration of the concatenated frame.

The address 1 field (430) identifies the receiver address and may be unicast or multicast, while the address 2 field (440) identifies the transmitter address, which is a unicast address.

The frame descriptor field 450 includes information related to the payload 460. For example, the frame descriptor field 450 may list the receivers to which the particular frame 400 is sent, the length of the payload 460, and the location and duration and type of subframes.

The FCS 470 verifies the integrity of the data. For example, if the information in the subframes 1-$n$ is able to be decoded by any MP 110 in the wireless communication system 100, then the FCS 470 may be included in the frame 400 only at the end of the frame 400. Alternatively, an FCS per subframe may be utilized in the case where not all the subframes 1-$n$ are to be decoded by all of the MPs 110 in the wireless communication system 100.

As discussed above, the payload 460 may include a plurality of subframes, such as subframe 1 (461), subframe 2 (465), and subframe n (471). The subframes are either data, control, or management subframes depending on the frame control type, and the location of each subframe is described by the frame descriptor field 470 as discussed above. For purposes of example, subframe 1 (461) is a control subframe containing signaling information such as an RTS, a CTS, or an ACK announcement. More particularly, the control subframe includes an MP Id field 462, a frame control field 463 substantially similar to the frame control field 410, and an FCS field 464 substantially similar to the FCS 470 described above.

The subframe 2 (465) is a concatenated data subframe which may contain user traffic for the MP identified by the MP Id field 466, a sender address (SA) field 467 which identifies the originating MP's unicast address, a length field 468, a MAC service data unit (MSDU) field 469, and an FCS field 472 also similar to the FCS field 470.

It should be noted that any combination of FCS fields, either in the header, or in the subframes may be utilized. Additionally, no FCS field at all may be utilized in an alternative embodiment of the present invention.

The MP Id fields 462 and 466 identify the subframe receiver address, which may be the next-hop address or the final destination address, and may be unicast or multicast. Additionally, in a multicast transmission, each MP 110 can uniquely define a neighboring MP with an MP Id that requires less memory than a typical identifier such as a MAC address which is 6 bytes.

Figure 5:
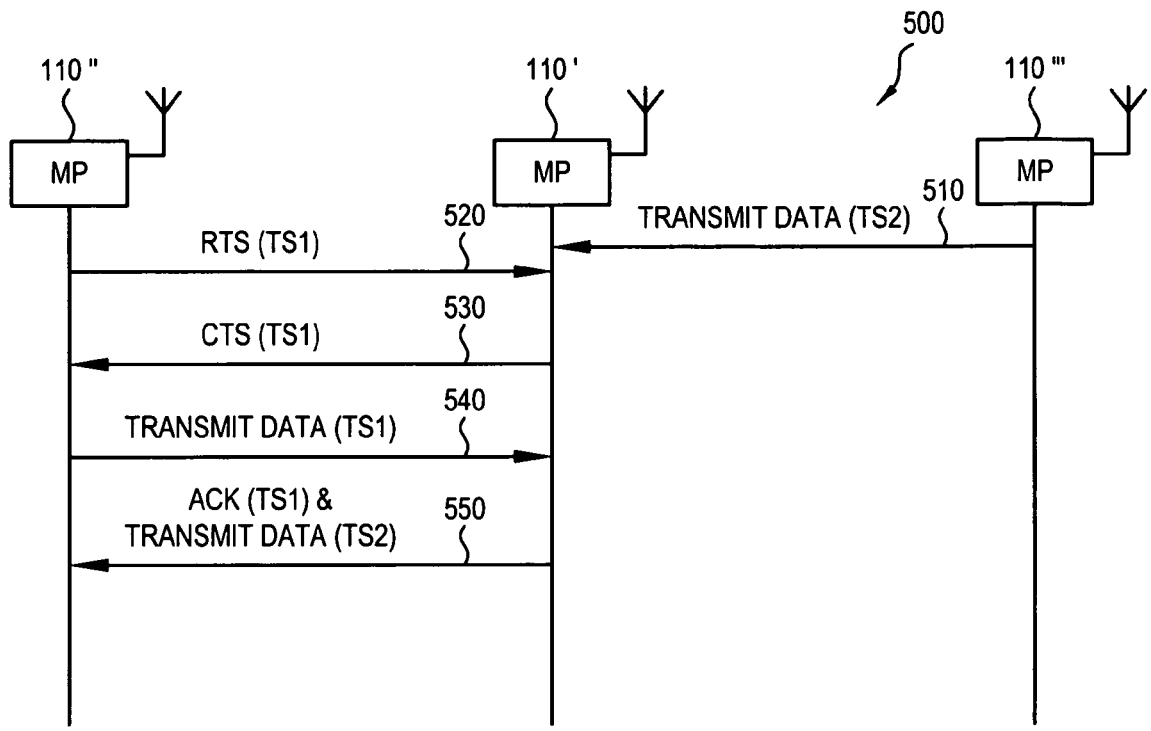
FIG. 5 is a signal diagram of MPs communicating with one another using unicast frame concatenation, in accordance with the present invention.

FIG. 5 is a signal diagram 500 of a plurality of MPs 110 (designated MP 110', MP 110", and MP 110'") communicating with one another using unicast frame concatenation, in accordance with the present invention. The MP 110'" transmits data from traffic stream 2 (TS2) to the MP 110' (510). The receiver 116 of the MP 110' receives the TS2 data via the antenna 118 and forwards TS2 to the processor 115. The processor 115 may store the TS2 data in the memory 119 for re-transmission. The receiver 116 of the MP 110' then receives a RTS signal for traffic stream 1 (TS1) from MP 110" (520) via the antenna 118 and forwards the RTS for TS1 to the processor 115.

The processor 115 of the MP 110' then identifies the MP 110" in the TS1 RTS signal and compares it with the next-hop address for the TS2 data. Accordingly, the MP 110' identifies MP 110" as the intended recipient for the TS2 data. Since the TS2 data has been received by the MP 110', the processor 115 of the MP 110' updates a CTS response to include the time required to complete the TS1 data transmission/reception along with the time required to send the TS2 data in the concatenated frame at the end of the transmission.

The processor 115 of the MP 110' transmits the CTS signal for TS1 to MP 110" (530) via the transmitter 117 and the antenna 118. The MP 110" receives the CTS for TS1 (530) and transmits the TS1 data to the MP 110' (540). The receiver 116 receives the TS1 data via the antenna 118 and forwards it to the processor 115.

Prior to transmitting an ACK for the TS1 data, the processor 115 concatenates the ACK control message along with a data subframe that includes the data TS2 intended for MP 110" (550). The processor 115 then transmits the concatenated frame via the transmitter 117 and the antenna 118. If the data TS2 was previously stored in the memory 119 of the MP 110', then the processor 115 extracts the data TS2 from the memory 119 prior to transmitting it to the MP 110". Accordingly, the ACK signal and the data TS2 signal are concatenated within a single data transmission from the MP 110' to the MP 110". MP 110" determines that the information in the control subframe and the data subframe transmitted by the MP 110' is intended for it by detecting its identification in the MP Id fields 462 and 466, respectively.

Figure 6:
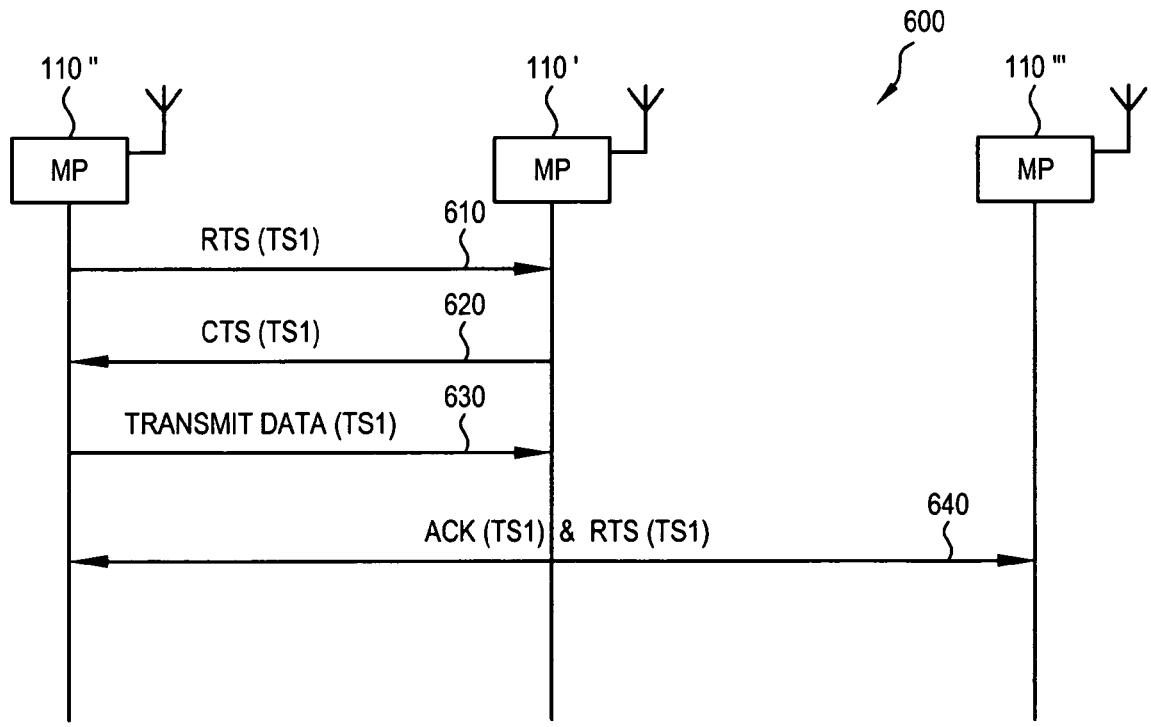
FIG. 6 is a signal diagram of MPs communicating with one another using multicast control subframe concatenation, in accordance with the present invention.

FIG. 6 is a signal diagram 600 of a plurality of MPs 110 (designated MP 110', MP 110", and MP 110'") communicating with one another using multicast control subframe concatenation, in accordance with the present invention. The MP 110" transmits a RTS for TS1 to MP 110' (610). The receiver of the MP 110' receives the RTS for TS1 from MP 110" (610) via the antenna 118 and forwards it to the processor 115.

The processor 115 of the MP 110' transmits a CTS signal for TS1 to the MP 110" (620) via the transmitter 117 and the antenna 118. The CTS includes in its duration the time required to complete the transmission/reception of the TS1 data along with the time required to transmit the TS2 data at the end of the transmission of the TS1 data.

The MP 110" receives the CTS for TS1 (620) and transmits the data TS1 to the MP 110' (630). The receiver 116 of the MP 110' receives the transmitted data TS1 (630) via the antenna 118 and forwards it to the processor 115. The processor 115 may store the data TS1 in the memory 119 for re-transmission.

The processor 115 then transmits to both the MP 110" and the MP 110''' a multicast concatenated frame (640) via the transmitter 117 and the antenna 118. The multicast concatenated frame includes a control subframe that identifies MP 110" in the MP Id field of the control subframe 461 and contains an ACK TS1 for MP 110", and a control subframe that identifies MP 110''' in the MP Id field of the control subframe and contains the RTS TS1 to MP 110'''. The MPs 110" and 110''', respectively, receive the transmitted multicast concatenated frame and decode the frame body to determine which control subframes are applicable to them via their unique MP Id (462) in the control subframe. Accordingly, the control subframe for the MP 110" and the control subframe for the MP 110''' can be combined in a single concatenated multicast frame from the MP 110'. Additionally, the frame body of the concatenated frames may include encryption to allow them to be read by all of the MPs 110 addressed by the transmitting MP 110' in the multicast group.

Figure 7:
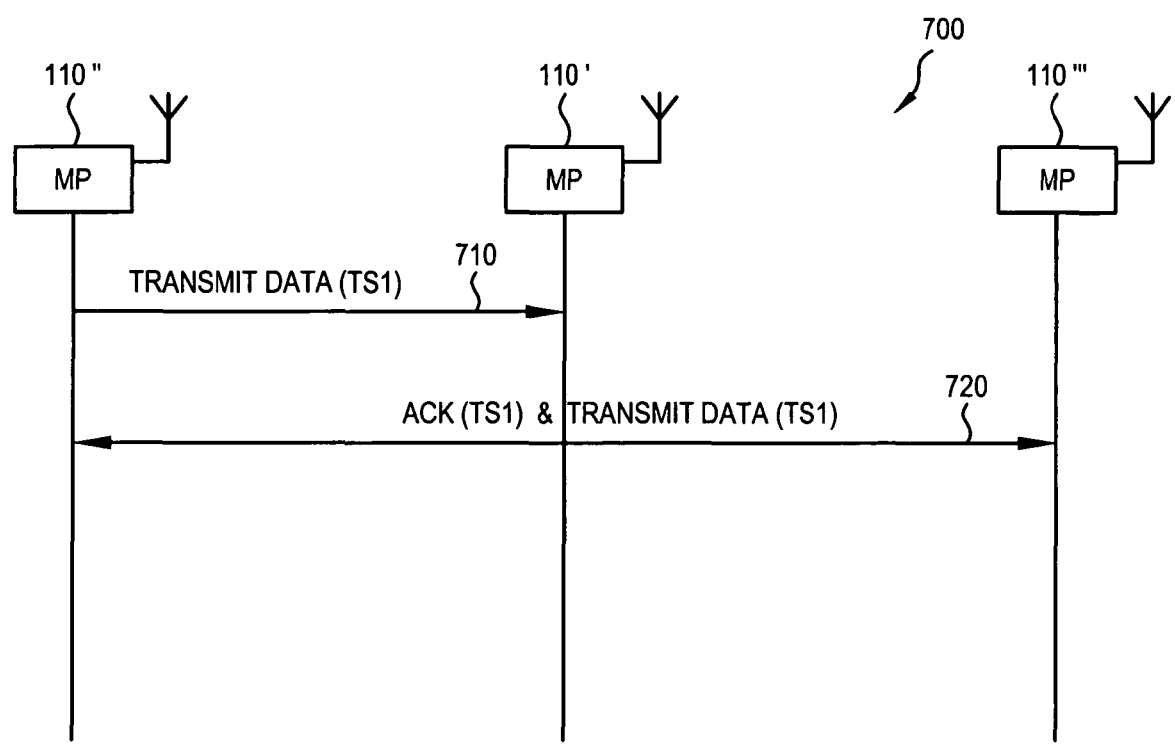
FIG. 7 is a signal diagram of MPs communicating with one another using multicast control and data subframe concatenation, in accordance with the present invention.

FIG. 7 is a signal diagram 700 of a plurality of MPs 110 (designated MP 110', MP 110", and MP 110''') communicating with one another using multicast control and data subframe concatenation, in accordance with the present invention. The MP 110" transmits data TS1 to the MP 110' (710). The receiver of the MP 110' receives the transmitted data TS1 (710) via the antenna 118 and forwards it to the processor 115. The processor 115 may store the data TS1 in the memory 119 for re-transmission.

The processor 115 then transmits to both the MP 110" and the MP 110''' a multicast concatenated frame (720) via the transmitter 117 and antenna 118. The multicast concatenated frame (720) includes a control subframe that identifies the MP 110" in the MP Id field of the control subframe and contains an ACK TS1 for MP 110", and a data subframe that identifies the MP 110''' in the MP Id field of the data subframe and contains the data TS1 for MP 110'''.

The MPs 110" and 110''', respectively, receive the transmitted multicast concatenated frame and decode the frame body to determine which subframes are applicable to them via their unique MP Id (462) in the control subframe or MP Id (466) in the data subframe. Accordingly, the control subframe for the MP 110" and the data subframe for the MP 110''' can be combined in a single concatenated multicast frame from the MP 110'. Additionally, the frame body of the concatenated frames may include encryption to allow them to be read by all of the MPs 110 addressed by the transmitting MP 110' in the multicast group.

The present invention may be implemented in any type of wireless communication system, as desired. By way of example, the present invention may be implemented in any type of 802 type system including, but not limited to 802.11, 802.15 or 802.16, or any other type of wireless communication system. The present invention may also be implemented as an application running on a processor, on an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s).

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for transmitting, in wireless communications, multicast concatenated frames implemented in a first mesh point (MP), comprising:
   receiving a data stream from a second MP, wherein the data stream is for further transmission to a third MP as a final destination; and
   transmitting a multicast concatenated frame to the second and third MPs, wherein the multicast concatenated frame includes one or more subframes selected from the group consisting of: data, control and management and wherein the multicast concatenated frame includes encryption and wherein the data subframe includes an MP Id field, a sender address (SA) field, a length field, a multicast medium access control (MAC) service data unit (MSDU) field, and a frame checksum (FCS) field.

2. The method of claim 1 wherein the control subframe includes an MP Id field, a frame control field, and a FCS field.

3. The method of claim 2 wherein the MP Id field identifies the receiver MP, the frame control field contains control information, and the FCS field verifies the integrity of the data stream.

4. The method of claim 3 wherein the control information includes request to send (RTS), clear to send (CTS), or acknowledgement (ACK) announcements.

5. The method of claim 4 wherein the multicast concatenated frame includes a control subframe transmitted to the second MP and a control subframe transmitted to the third MP.

6. The method of claim 5 wherein the control subframe transmitted to the second MP includes an ACK signal and the control subframe transmitted to the third MP includes an RTS signal.

7. The method of claim 5 wherein the control subframe directed to the second MP is detectable by its identification in the MP Id field in the control subframe, and the control subframe directed to the third MP is detectable by its identification in the MP Id field in the control subframe.

8. The method of claim 1 wherein the MP Id field identifies the receiver MP, the SA field identifies the originating MP, the length field identifies the length of the data, the MSDU field identifies a multicast destination address, and the FCS field verifies the integrity of the data stream.

9. The method of claim 8, further comprising transmitting a control subframe and a data subframe to the third MP.

10. The method of claim 9 wherein the data subframe includes the data stream from the second MP.

11. The method of claim 1 wherein the multicast concatenated frame includes a control subframe transmitted to the second MP and a control subframe transmitted to the third MP.

12. The method of claim 11 wherein the control subframe includes an ACK signal to the second MP and the data subframe includes the data stream from the second MP.

13. A mesh point (MP) comprising:
    a receiver;

a transmitter; and a processor in communication with both the receiver and the transmitter, wherein the processor is configured to transmit a multicast concatenated frame to a plurality of MPs in the wireless communication system; and wherein the multicast concatenated frame includes encryption and contains at least one of a control subframe, a management subframe and a data subframe identifying at least one other MP in the wireless communication system, wherein the data subframe includes an MP Id field, a sender address (SA) field, a length field, a multicast medium access control (MAC) service data unit (MSDU) field, and a frame checksum (FCS) field.

14. The MP of claim 13, further comprising a memory in communication with the processor.

15. The MP of claim 13, further comprising an antenna in communication with the receiver and the transmitter.

16. An integrated circuit (IC) comprising:

a receiver;

a transmitter; and a processor in communication with both the receiver and the transmitter, wherein the processor is configured to transmit a multicast concatenated frame to a plurality of MPs in the wireless communication system; and wherein the multicast concatenated frame includes encryption and contains at least one of a control subframe, a management subframe and a data subframe identifying at least one other MP in the wireless communication system, wherein the data subframe includes an MP Id field, a sender address (SA) field, a length field, a multicast medium access control (MAC) service data unit (MSDU) field, and a frame checksum (FCS) field.

17. The IC of claim 16, further comprising a memory in communication with the processor.

18. The IC of claim 16, further comprising an antenna in communication with the receiver and the transmitter.

* * * * *